US011249770B2

(12) United States Patent
Krishnakumar et al.

(10) Patent No.: US 11,249,770 B2
(45) Date of Patent: Feb. 15, 2022

(54) CONNECTED PROVISIONING

(71) Applicant: VMware, Inc., Palo Alto, CA (US)

(72) Inventors: Kishore Krishnakumar, Atlanta, GA (US); Vijay Chari Narayan, Johns Creek, GA (US); Brooks Peppin, Colorado Springs, CO (US); Paul Adam Ryman, Sydney (AU); Rob Schlotman, Cumming, GA (US)

(73) Assignee: VMware, Inc., Palo Alto, CA (US)

( * ) Notice: Subject to any disclaimer, the term of this patent is extended or adjusted under 35 U.S.C. 154(b) by 71 days.

(21) Appl. No.: 16/744,764

(22) Filed: Jan. 16, 2020

(65) Prior Publication Data
US 2021/0224080 A1    Jul. 22, 2021

(51) Int. Cl.
| G06F 9/00 | (2006.01) |
| G06F 9/445 | (2018.01) |
| G06F 21/73 | (2013.01) |
| G06F 8/61 | (2018.01) |
| G06F 9/4401 | (2018.01) |

(52) U.S. Cl.
CPC .............. *G06F 9/4451* (2013.01); *G06F 8/63* (2013.01); *G06F 9/4401* (2013.01); *G06F 21/73* (2013.01); *G06F 9/4411* (2013.01)

(58) Field of Classification Search
USPC .......................................................... 713/1
See application file for complete search history.

(56) References Cited

U.S. PATENT DOCUMENTS

| 9,038,154 | B2* | 5/2015 | Lord .................. H04L 63/0853 |
| | | | 726/9 |
| 10,687,187 | B2* | 6/2020 | Satoh ...................... H04W 4/60 |
| 2005/0125689 | A1* | 6/2005 | Snyder ................. H04L 63/102 |
| | | | 726/26 |
| 2006/0208931 | A1* | 9/2006 | Boese ................... H04L 67/104 |
| | | | 341/50 |
| 2007/0180448 | A1* | 8/2007 | Low ....................... G06F 9/5055 |
| | | | 718/1 |
| 2007/0198664 | A1* | 8/2007 | Satkunanathan ... H04L 41/0806 |
| | | | 709/220 |
| 2007/0234346 | A1* | 10/2007 | Kramer ..................... G06F 8/61 |
| | | | 717/174 |
| 2008/0034068 | A1* | 2/2008 | Vaughan ............... G06Q 10/06 |
| | | | 709/220 |
| 2008/0082657 | A1* | 4/2008 | Hart .................... H04L 41/0681 |
| | | | 709/224 |
| 2008/0098387 | A1* | 4/2008 | Lo ............................. G06F 8/60 |
| | | | 717/174 |

(Continued)

*Primary Examiner* — Volvick Derose
(74) *Attorney, Agent, or Firm* — Thomas|Horstemeyer, LLP (57) ABSTRACT

Disclosed are various embodiments for provisioning client devices. A configuration file previously installed on the computing device can be read. The configuration file can contain a provisioning address. Then, a user account is automatically created using a predefined username and credential stored in the configuration file. Next, an enrollment request can be sent to the provisioning address to enroll the computing device with a provisioning service using the user account. In response, an enrollment response can be received from the provisioning service. The computing device can then be configured based upon the enrollment response.

18 Claims, 5 Drawing Sheets

(56) References Cited

U.S. PATENT DOCUMENTS

| | | | |
|---|---|---|---|
| 2009/0288079 A1* | 11/2009 | Zuber | G06F 21/51 717/176 |
| 2010/0306760 A1* | 12/2010 | Mulligan | G06F 9/44505 717/174 |
| 2012/0151020 A1* | 6/2012 | Bolay | H04L 41/0816 709/221 |
| 2013/0086130 A1* | 4/2013 | Wang | G06F 8/60 707/812 |
| 2013/0117359 A1* | 5/2013 | Husain | G06F 9/445 709/203 |
| 2014/0087709 A1* | 3/2014 | Nielsen | H04W 4/50 455/418 |
| 2014/0181801 A1* | 6/2014 | Voronkov | G06F 8/63 717/177 |
| 2014/0298324 A1* | 10/2014 | Voronkov | G06F 21/629 717/178 |
| 2017/0090896 A1* | 3/2017 | Lin | G06F 8/61 |
| 2017/0154189 A1* | 6/2017 | Betzler | G06F 9/45558 |
| 2018/0139241 A1* | 5/2018 | Jacobsen | H04L 63/20 |

* cited by examiner

CONNECTED PROVISIONING

BACKGROUND

Customers, such as enterprises or similar large organizations, often have standardized configurations for computing devices that they procure. For example, they can have a standard set of applications that are installed on every device to enable their workforce to perform their duties effectively. While these standard sets of application can be installed at the factory using a preconfigured machine image or provisioning package (PPKG) file, keeping these up to date is often difficult. Factory floors are often isolated from the Internet for security purposes, so changes to the preconfigured machine image or PPKG file often have to be manually delivered and configured for installation. Such a process can take months. By the time a new machine image or PPKG file is delivered, it can already be out of date. There is also an administrative burden associated with maintaining multiple machine images or PPKG files at the factory. Each machine image or PPKG file must be separately stored and workers must verify that the correct machine image or PPKG is being used when configuring a customer's device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure.

Moreover, in the drawings, like reference numerals designate corresponding parts throughout the several views.

DETAILED DESCRIPTION

Disclosed are various approaches for using a single machine image or provisioning package (PPKG) file to configure computing devices assembled at the factory. Once initially configured, the device can connect to a service specified in a configuration file installed on the computing device. The service can then send various configuration settings and applications to the computing device for installation. As a result, the factory can use a common set of machine images or PPKG files for all devices assembled by the factory, while using customer specific configuration files for customer devices. As the data in the configuration files is unlikely to change over time for reasons further described in this application, the factory does not have to worry about whether the latest version of the machine image or PPKG file is being used.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
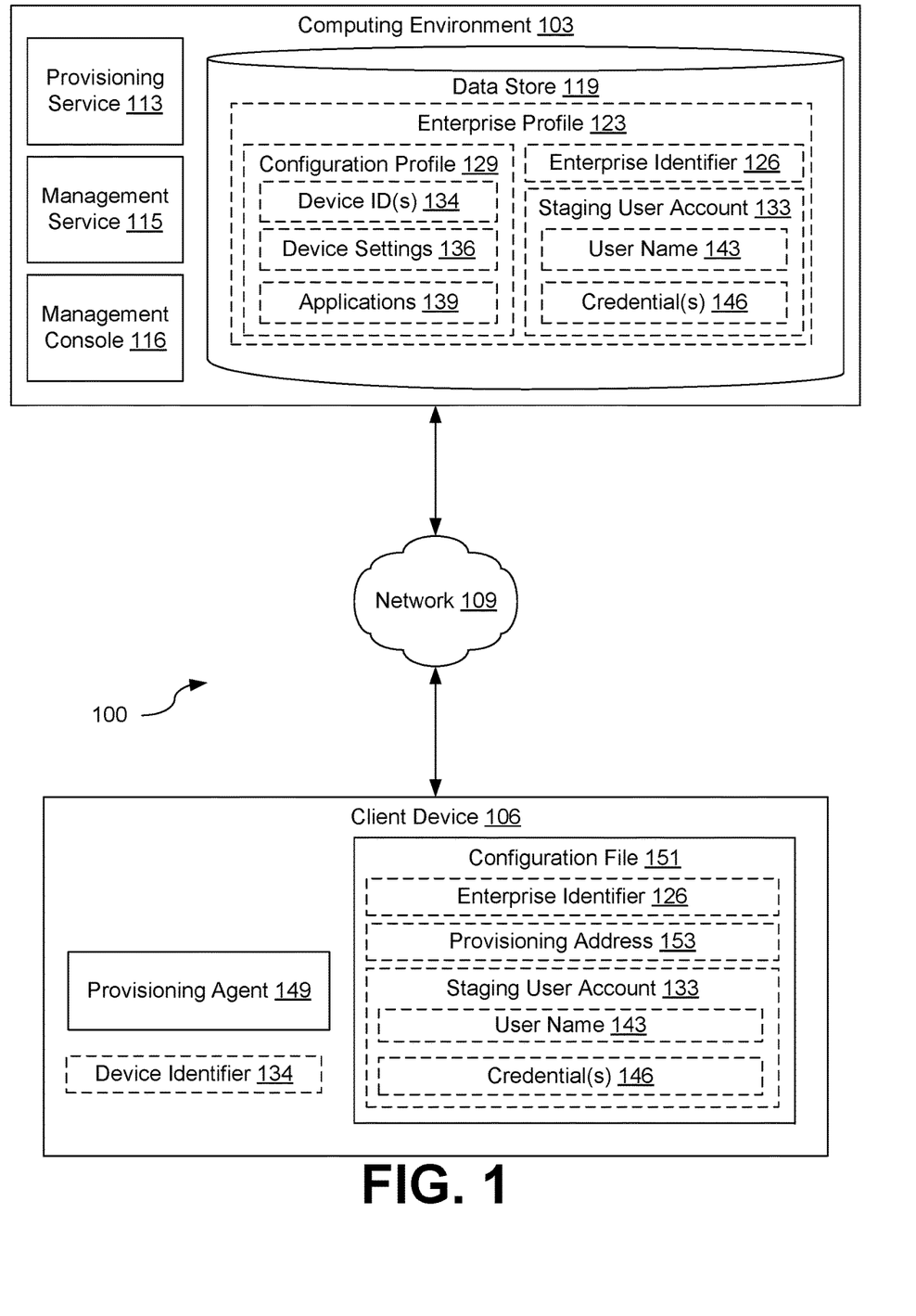
FIG. 1 is a drawing of a network environment according to various embodiments of the present disclosure.

With reference to FIG. 1, shown is a network environment 100 according to various embodiments. The network environment 100 can include a computing environment 103, and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a provisioning service 113, a management console 116, and other applications, services, processes, systems, engines, or functionality not discussed in detail herein.

The provisioning service 113 can be executed to provide manage the configuration of client devices 106 that are registered or enrolled with the provisioning service 113, as further described in this application.

The management service 115 can administer the operation of client devices 106 that are registered or otherwise enrolled with the management service 115. To this end, the management service 115 can also provide mechanisms for a client device 106 to enroll or otherwise register with the management service 115. As part of the enrollment process, a secure connection can be created or established between the management service 115 and a client device 106 (e.g., using a version of the secure sockets layer (SSL) or transport layer security (TLS) protocol). The management service 115 can also install or cause to be installed various applications on the client device 106 or for various configuration settings of the client device 106 to be set to a specified value.

The management console 116 can be executed to provide an administrative interface to the provisioning service 113 and/or the management service 115. In some instances, the management console 116 can be implemented as a stand-alone or independent application. In other instances, the management console 116 can implemented as a web- or network-based application or service (e.g., a website, web portal, or web service). Accordingly, the management console 116 could be used to upload data stored in the data store 119 or configure data or setting stored in the data store 119.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. The data stored in the data store 119 is associated with the operation of the various applications or functional entities described below. This data can include one or more enterprise profiles 123, and potentially other data.

The enterprise profile 123 can represent the information associated with a particular enterprise or organization for configuring client devices 106. This can include an enterprise identifier 126, a configuration profile 129, and a staging user account 133. Generally, the enterprise profile 123 could be used in a multi-tenant environment, such as where the provisioning service 113 is operated by a cloud or hosted provider. In situations where an enterprise operates or otherwise controls its own provisioning service 113, an enterprise profile 123 can be optional.

An enterprise identifier 126 can be used to uniquely identify an enterprise with respect to another enterprise and, therefore, uniquely identify respective enterprise profiles 123. An enterprise identifier 126 could take the form of an alphanumeric character string (e.g., a company name), a universal unique identifier (UUID), a globally unique identifier (GUID), or similar unique identifier.

The configuration profile 129 can represent information regarding how a newly provisioned or enrolled client device 106 should be configured. For example, an enterprise can have a standard configuration to be used for all client devices 106 operated by the enterprise. This could include one or more device identifiers 134, a set of device settings 136, and/or applications 139 to be installed on a client device 106. The device settings 136, applications 139, and/or the staging user account 133) can be distributed in the form of one or more packages, such as a MICROSOFT Provisioning Package (PPKG).

The device identifier 134 represents a unique identifier of a client device 106 for which the configuration profile 129 is applicable. As an enterprise purchases new client devices 106, their device identifiers 134 can be added to configuration profiles 129. For example, all device identifiers 134 for software developer devices can be assigned to one configuration profile 129, while all device identifiers 134 for devices operated by the marketing team can be assigned to another configuration profile 129. Accordingly, separate segments of an enterprise can be represented or managed using a respective configuration profile 129. Examples of device identifiers 134 include serial numbers, service tag numbers, and similar identifiers that uniquely identify a client device 106 with respect to other client devices 106.

Device settings 136 can represent values for various settings of a client device 106. This could include operating system settings (e.g., network configurations, proxy configurations, security settings, etc.) or application settings (e.g., configuration settings for a browser, virtual private network (VPN) client, office suite, etc.).

The applications 139 can represent those applications that have been specified or identified as to be installed in a newly provisioned or enrolled client device 106. Each application 139 identified in the configuration profile 129 can include a link to or a copy of an installer for the application 139, which can be used to install or otherwise deploy the application to a client device 106.

The staging user account 133 can represent a user account created for the purpose of a client device 106 to authenticate with the provisioning service 113 in order to be configured by the provisioning service 113. Accordingly, the staging user account 133 can contain a user name 143 and one or more credentials 146. The user name 143 can represent the name of the staging user account 133 to distinguish from other user accounts that can exist on the client device 106. The credentials 146 can represent any data that allows for a client device 106 to authenticate with the provisioning service 113 using the staging user account 133. Credentials 146 can include passwords, personal identification numbers (PINs), cryptographic certificates or key pairs, etc.

The client device 106 is representative of a plurality of client devices that can be coupled to the network 109. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a client application provisioning agent 149. The client device 106 can be configured to execute applications beyond the provisioning agent 149, such as email applications, social networking applications, word processors, spreadsheets, or other applications.

The provisioning agent 149 can be executed to connect to the provisioning service 113 in order to configure a client device 106 in compliance with a configuration profile 129. The provisioning agent 149 could be installed, for example, at the factory that manufactured the client device 106 (e.g., as part of a machine image used to configure the client device 106).

Also, various data is stored in a configuration file 151 that is accessible to applications executing on the client device 106. The data stored in the client data store 151 is associated with the operation of the various applications or functional entities described below. This data can include one or more enterprise identifiers 126, staging user accounts 133, provisioning addresses 153, and potentially other data.

The provisioning address 153 represents a network location where the provisioning agent 149 can contact the provisioning service 113. For example, the provisioning address 153 could be in the form of an internet protocol (IP) address or a uniform resource locator (URL).

As information related to the provisioning address 153 and staging user account 133 (including the user name 143 and credentials 146) is unlikely to change over time, the factory at which a client device 106 is assembled is able to make use of a single machine image or PPKG file that includes a provisioning agent 149 for multiple customers, with only customer specific configuration files 151 to be installed on customer client devices 106. The factory is, therefore, relieved of the burden of maintaining up-to-date machine images or PPKG files that contain customer specific device settings 136 and applications 139.

Next, a general description of the operation of the various components of the network environment 100 is provided. While this general description is provided for illustrative purposes, other operations or interactions between the various components is also possible. More detailed description about the operations of or interactions between the individual components is provided in discussion accompanying the subsequent figures.

To begin with a first example, a client device 106 can be ordered by an enterprise and initially configured by the factory where it is assembled. During the initial configuration, a basic machine image or provisioning package (PPKG) file can be used to install the operating system and various other factory default programs. At this point, the provisioning agent 149 can be installed as well as a customer specific configuration file 151. For example, if a first enterprise ordered the client device 106, then a first configuration file 151 might be loaded onto the client device 106. Likewise, if a second enterprise ordered the client device 106, then a second configuration file 151 might be loaded onto the client device 106.

Once the client device 106 leaves the factory, it is eventually connected to the network 109 and booted for the first time. At this point, the provisioning agent 149 can read the configuration file 151 to identify the provisioning address 153 where a provisioning service 113 is located. The provisioning agent 149 can also identify the enterprise identifier 126, user name 143, and credentials 146 to include in a request to the provisioning service 113.

The provisioning agent 149 can then send a request to the provisioning service 113 to enroll or register with the provisioning service 113. The request can include the enterprise identifier 126, user name 143, and credentials 146 necessary to authenticate with the provisioning service 113. In response to determining that the user name 143 and credentials 146 are correct for the staging user account 133 contained in the enterprise profile 123, the provisioning service 113 can send device settings 136 and applications 139 specified in the configuration profile 129 to the provisioning agent 149.

Upon receipt of the device settings 136 and applications 139, the provisioning agent 149 can proceed to configure the client device 106. For example, the provisioning agent 149 could install each application 139 on the client device 106 specified by the provisioning service 113. The provisioning agent 149 could then specify each system or application setting of the client device 106 to a respective value specified by the device settings 136.

In a second example, however, a client device 106 can be ordered by an enterprise and initially configured by the factory where it is assembled. During the initial configuration, a basic machine image or provisioning package (PPKG) file can be used to install the operating system and various other factory default programs. At this point, the provisioning agent 149 can be installed as well to provide for subsequent configuration of the client device 106. The provisioning agent 149 can have a provisioning URL 153 hardcoded within the application, which can be used to connect to the provisioning service 113.

The provisioning agent 149 can then contact the provisioning service 113 to receive enterprise specific details for an enterprise's management service 115. For example, the provisioning agent 149 could receive a copy of the enterprise identifier 126 for an enterprise specific management service 115 and a one-time authentication token (e.g., a one-time password) to allow the provisioning agent 149 to contact, authenticate, and enroll itself with the management service 115. In some implementations, the provisioning agent 149 can authenticate itself with the provisioning service 113 using its device identifier 134. In some implementations, additional authentication information can be provided (e.g., a pre-installed specified cryptographic certificate).

The provisioning agent 149 can then contact the management service 115 to enroll itself with the management service 115. For example, the provisioning agent 149 could provide the one-time authentication token along with its device serial number or other unique device identifier. In response, the management service 115 could enroll the provisioning agent 149 with the management service 115.

Subsequent to enrollment with the management service 115, the provisioning agent 149 can receive a first PPKG file, which can be referred to as an enrollment PPKG. The provisioning agent 149 can execute or otherwise apply the first PPKG file, which can configure the client device 106 to implement a staging user account 133. Once the staging user account 133 is configured on the client device 106, additional applications 139 or device settings 136 can be pushed down to the client device 106, either individually or bundled in a second PPKG file.

Figure 2:
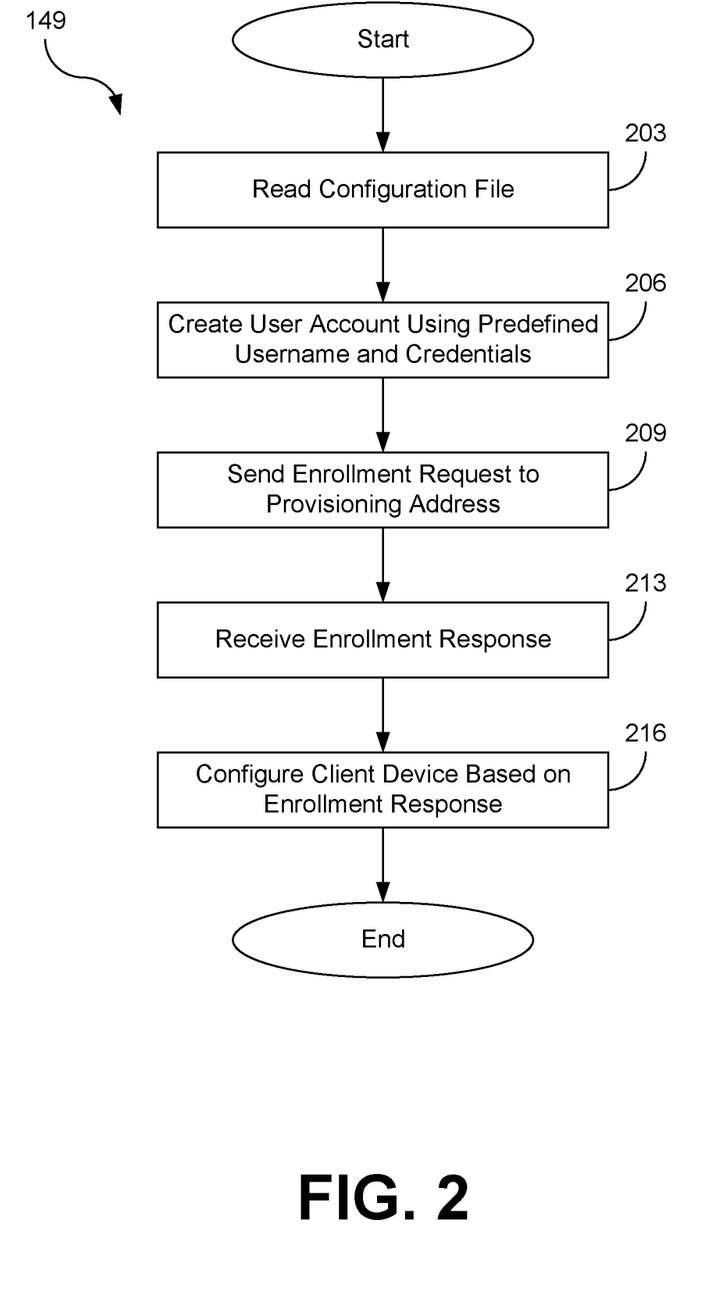
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the provisioning agent 149. The flowchart of FIG. 2 provides merely an example of the many different types of functional arrangements that can be employed to implement the operation of the depicted portion of the provisioning agent 149. As an alternative, the flowchart of FIG. 2 can be viewed as depicting an example of elements of a method implemented within the network environment 100.

Beginning with step 203, the provisioning agent 149 can read data from a configuration file 151 to determine how to configure the client device 106. This data can include information regarding the staging user account 133 and/or the provisioning address 153. This can occur in response to the client device 106 being booted for the first time subsequent to its configuration or assembly at the factory. It can also occur, for example, in response to the first time the client device 106 is connected to the network 109.

Then at step 206, the provisioning agent 149 can create a local user account that represents the staging user account 133 specified in configuration file 151. For example, the provisioning agent 149 could create a local user account that has the same user name 143 and credentials 146 as the staging user account 133. This can be done to allow the provisioning agent 149 to authenticate the client device 106 with the provisioning service 113 using the staging user account 133.

Next at step 209, the provisioning agent 149 can send an enrollment request to the provisioning service 113. For example, the provisioning agent 149 might send an enrollment request to the provisioning address 153 specified in the configuration file 151. However, in some implementations, the provisioning address 153 could be hard-coded within the provisioning agent 149. The enrollment request could also include the user name 143 and credentials 146 of the staging user account 133. In some implementations, the enrollment request could also include the enterprise identifier 126 specified in the configuration file 151. Likewise, the enrollment request could also include the device identifier 134 of the client device 106.

Subsequently at step 213, the provisioning agent 149 can receive an enrollment response from the provisioning service 113. The enrollment response can include values for one or more device settings 136 to be set and/or one or more applications 139 to be installed on the client device 106. In some instances, the enrollment response can include copies of the applications 139 themselves or installers for the applications 139 (e.g., in the form of a provisioning package (PPKG) file). In other instances, the enrollment response can contain URLs or similar network addresses where the installers for the applications 139 can be found.

Then at step 213, the provisioning agent 149 can configure the client device 106 in response to receipt of the enrollment response. For example, if the enrollment response contains a PPKG file containing the applications 139 to be installed, then the provisioning agent 149 can apply the PPKG file to the client device 106. This could include, for example, decompressing the PPKG file and executing individual application 139 installers contained in the PPKG file. As another example, if the enrollment response contains a URL for the installer of an application 139, the provisioning agent 149 could download the installer from the URL and execute it to install the application 139 on the client device 106. Once any and all of the applications 139 identified in the enrollment response are installed, the provisioning agent 149 can individual settings or the client device 106 or applications 139 installed on the client device 106 to the values specified by the device settings 136. For example, if the device settings 136 specify a particular proxy server be used for all network traffic, the proxy server could be set accordingly. As another example, if the device settings 136 specified default settings for an email client (e.g., the mail server to be used and its respective configuration settings), then the email client could be configured according to the device settings 136 received in the enrollment response. Once the client device 106 is appropriately configured, the process can subsequently end.

Figure 3:
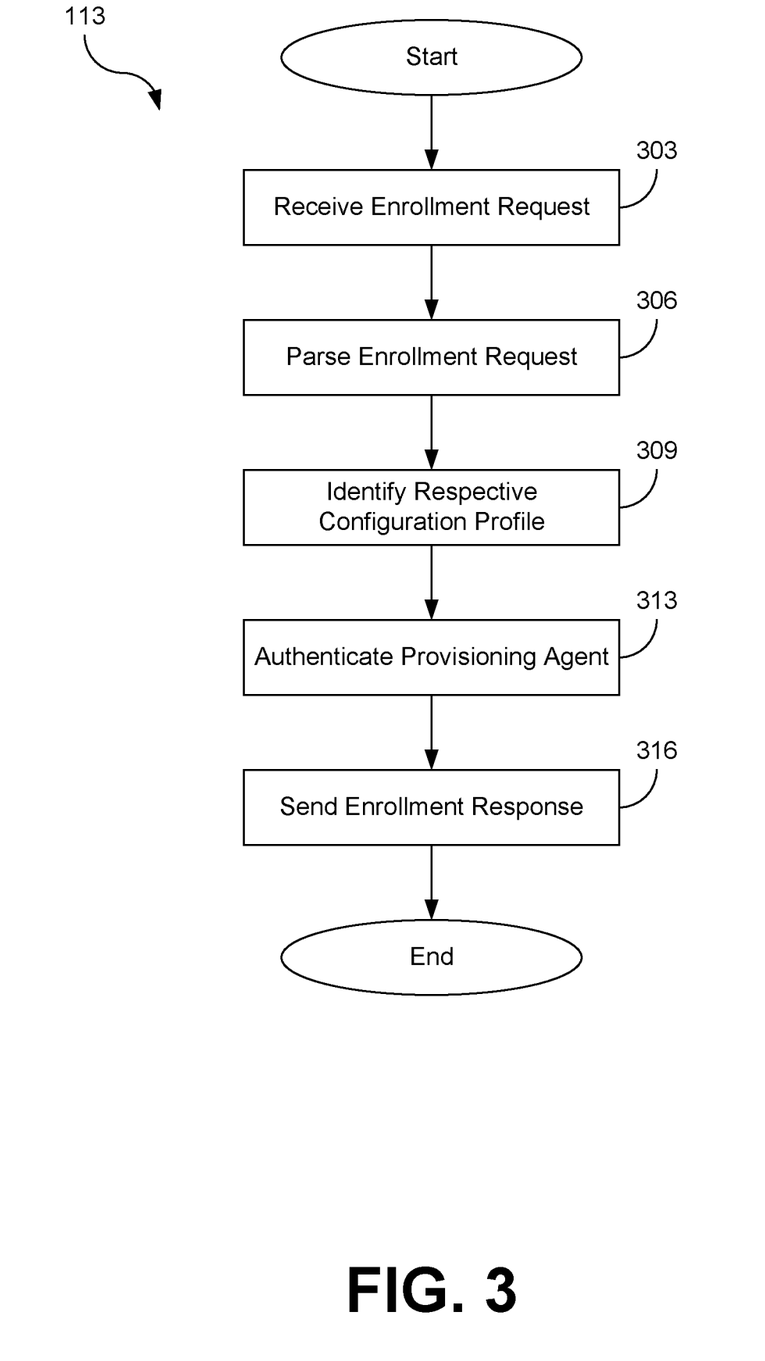
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the provisioning service 113. The flowchart of FIG. 3 provides merely an example of the many different types of functional arrangements that can be employed to implement the operation of the depicted portion of the provisioning service 113. As an alternative, the flowchart of FIG. 3 can be viewed as depicting an example of elements of a method implemented within the network environment 100.

Beginning with step 303, the provisioning service 113 can receive an enrollment request from a provisioning agent 149. The enrollment request can be received in response to the client device 106 hosting the provisioning agent 149 booting for first time after being assembled and configured at the factory, as previously described.

Then at step 306, the provisioning service 113 can parse the enrollment request to identify the relevant portions. For example, the provisioning service 113 can parse the enrollment request and extract an enterprise identifier 126, a user name 143, and one or more credentials 146.

Next at step 309, the provisioning service 113 can query the data store 119 to find a respective configuration profile 129. For example, the provisioning service 113 could first query the data store to search for an enterprise profile 123 associated with the enterprise identifier 126. For example, the provisioning service can provide the enterprise identifier 126 as an argument to a search query and receive an enterprise profile 123 containing the matching enterprise identifier 126 in response. The provisioning service 113 could then use the received device identifier 134 to retrieve the appropriate configuration profile 129 for the client device 106.

Subsequently at step 313, the provisioning service 113 can authenticate the provisioning agent 149. For example, the provisioning service 113 could compare the user name 143 and the credentials 146 contained in the enrollment request with the user name 143 and credentials 146 specified in the staging user account 133 stored in the data store 119. If the user name 143 and credentials 146 in the enrollment request match those specified in the staging user account 133 match, then the enrollment request is determined to come from an authorized and authenticated client device 106.

Then at step 316, the provisioning service 113 can send an enrollment response to the provisioning agent 149 in response to authentication at step 313. The enrollment response can include one or more device settings 136 and one or more applications 139 specified in the configuration profile 129 within the enterprise profile 123. In some implementations, the applications 139 can be provided as a bundled PPKG file or as a set of individual application installers. In other implementations, the provisioning service 113 can provide one or more URLS to the provisioning agent 149 from which the provisioning agent 149 can access or otherwise retrieve the respective applications 139. Once the enrollment response is sent, the process ends.

Figure 4:
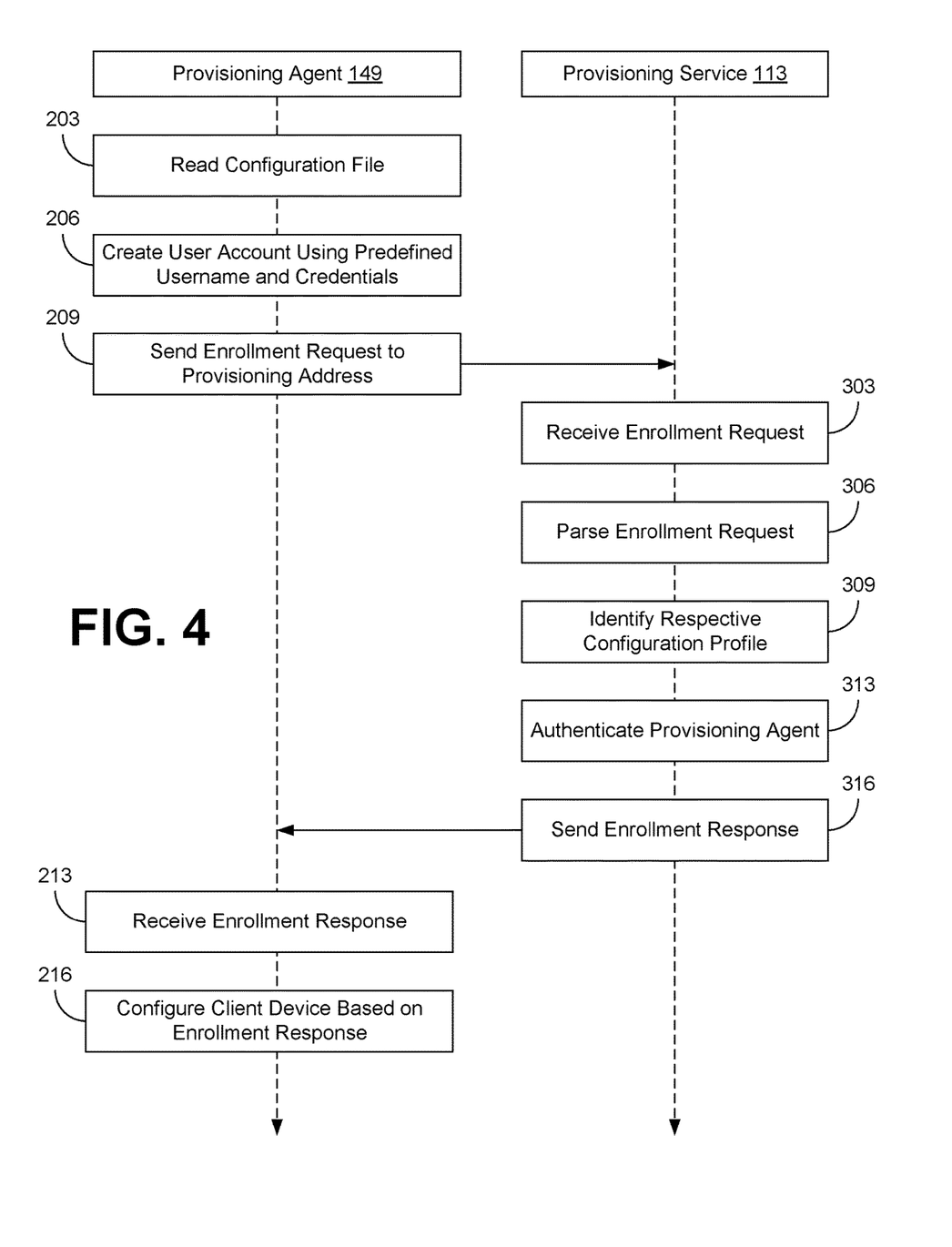
FIG. 4 is a sequence diagram illustrating one example of functionality implemented as portions of an application executed in a computing environment in the network environment of FIG. 1 according to various embodiments of the present disclosure.

Referring next to FIG. 4, shown is a sequence diagram that provides one example of the interaction between the provisioning agent 149 and the provisioning service 113. The sequence diagram of FIG. 4 provides merely an example of the many different types of functional arrangements that can be employed to implement the interactions of the provisioning agent 149 and the provisioning service 113. As an alternative, the sequence diagram of FIG. 4 can be viewed as depicting an example of elements of a method implemented within the network environment 100.

Previously described steps 203, 206, 209, 213, 216, 303, 306, 309, 313, and 316 are illustrated in FIG. 4. The functionality of each of these steps is similar to that previously described in the discussion of FIGS. 2 and 3. However, the sequence of steps 203, 206, 209, 213, 216, 303, 306, 309, 313, and 316 is depicted to illustrate the interactions between the provisioning agent 149 and the provisioning service 113.

Figure 5:
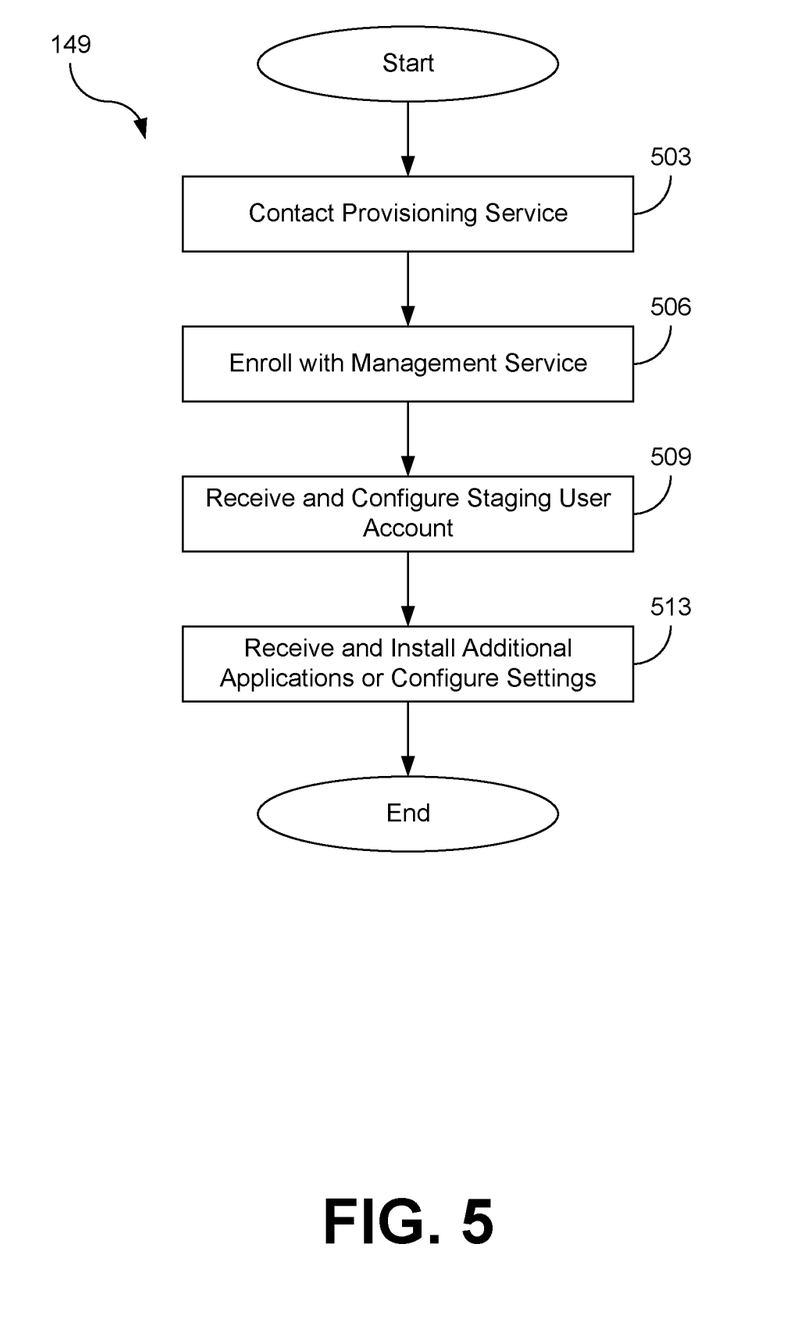
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the provisioning agent 149. The flowchart of FIG. 5 provides merely an example of the many different types of functional arrangements that can be employed to implement the operation of the depicted portion of the provisioning agent 149. As an alternative, the flowchart of FIG. 5 can be viewed as depicting an example of elements of a method implemented within the network environment 100.

Beginning with step 503, the provisioning agent 149 can contact a provisioning service 113 located at the provisioning address 153 to receive enterprise specific details for an enterprise's management service 115. For example, the provisioning agent 149 could receive a copy of the enterprise identifier 126 for an enterprise specific management service 115 and a one-time authentication token (e.g., a one-time password) to allow the provisioning agent 149 to contact, authenticate, and enroll itself with the management service 115. In some implementations, the provisioning agent 149 can authenticate itself with the provisioning service 113 using its device identifier 134. In some implementations, additional authentication information can be provided (e.g., a pre-installed specified cryptographic certificate).

Moving on to step 506, the provisioning agent 149 can then contact the management service 115 to enroll itself with the management service 115. For example, the provisioning agent 149 could provide the one-time authentication token received at step 503 and its device identifier 134. In response, the management service 115 could enroll the provisioning agent 149 with the management service 115.

At step 509, and subsequent to enrollment with the management service 115, the provisioning agent 149 can receive a first PPKG file, which can be referred to as an enrollment PPKG. The provisioning agent 149 can execute or otherwise apply the first PPKG file, which can configure the client device 106 to create a staging user account 133.

Then, at step 513, the provisioning agent 149 can receive additional applications 139 or device settings 136 for installation using the staging user account 133. The additional applications 139 or device settings 136 can be received either individually or bundled in a second PPKG file. Upon receipt, the provisioning agent 149 can cause the client device 106 to install the applications 139 or apply the second PPKG file using the staging user account 133 to complete the setup of the client device 106.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
read a configuration file previously installed on the computing device, the configuration file containing a provisioning address and an enterprise identifier that uniquely identifies an enterprise associated with the computing device with respect to another enterprise;
automatically create a user account using a predefined username and credential stored in the configuration file;
send an enrollment request to the provisioning address to enroll the computing device with a provisioning service using the user account, the enrollment request comprising the enterprise identifier;
receive an enrollment response from the provisioning service, the enrollment response comprising a provisioning package (PPKG) file; and
apply the PPKG file to configure the computing device.

2. The system of claim 1, wherein the PPKG file comprises an application installer for an application to be installed on the computing device and the machine-readable instructions that cause the computing device to apply the PPKG file further cause the computing device to install the application using the application installer.

3. The system of claim 2, wherein the machine-readable instructions that cause the computing device to apply the PPKG file, when executed by the processor, further cause the computing device to at least:
decompress the PPKG file to obtain the application installer; and
execute the application installer to install the application and configure the computing device.

4. The system of claim 1, wherein the PPKG file in the enrollment response comprises at least one value for at least one configuration setting for the computing device and the machine-readable instructions that cause the computing device to apply the PPKG file further cause the computing device to set the at least one configuration setting to the at least one value.

5. The system of claim 1, wherein the machine-readable instructions that cause the computing device to read the configuration file previously installed on the computing device are executed in response to a first boot of the computing device.

6. The system of claim 1, wherein the enrollment request comprises a unique identifier for the computing device.

7. A method, comprising:
reading a configuration file previously installed on a computing device, the configuration file containing a provisioning address and an enterprise identifier that uniquely identifies an enterprise associated with the computing device with respect to another enterprise;
automatically creating a user account using a predefined username and credential stored in the configuration file;
sending an enrollment request to the provisioning address to enroll the computing device with a provisioning service using the user account, the enrollment request comprising the enterprise identifier;
receiving an enrollment response from the provisioning service, the enrollment response comprising a provisioning package (PPKG) file; and
applying the PPKG file to configure the computing device.

8. The method of claim 7, wherein the PPKG file comprises an application installer for an application to be installed on the computing device and applying the PPKG file further comprises installing the application.

9. The method of claim 7, wherein applying the PPKG file further comprises:
   decompressing the PPKG file to obtain the application installer; and
   executing the application installer to install the application and configure the computing device.

10. The method of claim 7, wherein the PPKG file in the enrollment response comprises at least one value for at least one configuration setting for the computing device and applying the PPKG file further comprises setting the at least one configuration setting to the at least one value.

11. The method of claim 7, wherein reading the configuration file occurs in response to a first boot of the computing device.

12. The method of claim 7, wherein the enrollment request comprises a unique identifier for the computing device.

13. A non-transitory, computer-readable medium, comprising machine-readable instructions that, when executed by a processor of a computing device, cause the computing device to at least:
   read a configuration file previously installed on the computing device, the configuration file containing a provisioning address and an enterprise identifier that uniquely identifies an enterprise associated with the computing device with respect to another enterprise;
   automatically create a user account using a predefined username and credential stored in the configuration file;
   send an enrollment request to the provisioning address to enroll the computing device with a provisioning service using the user account, the enrollment request comprising the enterprise identifier;
   receive an enrollment response from the provisioning service, the enrollment response comprising a provisioning package (PPKG) file; and
   apply the PPKG file to configure the computing device.

14. The non-transitory, computer-readable medium of claim 13, wherein the PPKG file comprises an application installer for an application to be installed on the computing device and the machine-readable instructions that cause the computing device to apply the PPKG file further cause the computing device to install the application using the application installer.

15. The non-transitory, computer-readable medium of claim 14, wherein the machine-readable instructions that cause the computing device to apply the PPKG file, when executed by the processor, further cause the computing device to at least:
   decompress the PPKG file to obtain the application installer; and
   execute the application installer to install the application and configure the computing device.

16. The non-transitory, computer-readable medium of claim 13, wherein the PPKG file in the enrollment response comprises at least one value for at least one configuration setting for the computing device and the machine-readable instructions that cause the computing device to apply the PPKG file further cause the computing device to set the at least one configuration setting to the at least one value.

17. The non-transitory, computer-readable medium of claim 13, wherein the machine-readable instructions that, when executed by the processor, cause the computing device to read the configuration file previously installed on the computing device are executed in response to a first boot of the computing device.

18. The non-transitory, computer-readable medium of claim 13, wherein the enrollment request comprises a unique identifier for the computing device.

* * * * *